(12) United States Patent
Hough et al.

(10) Patent No.: US 6,518,570 B1
(45) Date of Patent: *Feb. 11, 2003

(54) SENSING MODE ATOMIC FORCE MICROSCOPE

(75) Inventors: Paul V. C. Hough, Port Jefferson, NY (US); Chengpu Wang, Upton, NY (US)

(73) Assignee: Brookhaven Science Associates, Upton, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,809

(22) Filed: Apr. 3, 1998

(51) Int. Cl.[7] .............................. G01B 5/28; G01B 7/34
(52) U.S. Cl. ......................... 250/306; 250/307; 73/105
(58) Field of Search ................................. 250/306, 307; 73/105

(56) References Cited

U.S. PATENT DOCUMENTS

| | | | | |
|---|---|---|---|---|
| 5,229,606 A | | 7/1993 | Elings et al. | 250/306 |
| 5,298,975 A | | 3/1994 | Khoury et al. | 356/375 |
| 5,308,974 A | | 5/1994 | Elings et al. | 250/234 |
| 5,338,932 A | | 8/1994 | Theodore et al. | 250/306 |
| 5,345,816 A | | 9/1994 | Clabes et al. | 73/105 |
| 5,414,690 A | | 5/1995 | Shido et al. | 369/126 |
| 5,418,363 A | | 5/1995 | Elings et al. | 250/306 |
| 5,439,777 A | | 8/1995 | Kawada et al. | 430/270 |
| 5,467,642 A | | 11/1995 | Hosaka et al. | 73/105 |
| 5,513,518 A | | 5/1996 | Lindsay | 73/105 |
| 5,515,719 A | | 5/1996 | Lindsay | 73/105 |
| 5,519,212 A | * | 5/1996 | Elings et al. | 250/306 |
| 5,589,686 A | | 12/1996 | Ohara | 250/306 |
| 5,670,712 A | * | 9/1997 | Cleveland et al. | 73/105 |
| 5,750,989 A | * | 5/1998 | Lindsay et al. | 250/306 |
| 5,866,805 A | * | 2/1999 | Han et al. | 73/105 |
| RE36,488 E | * | 7/2000 | Elings et al. | 250/306 |

OTHER PUBLICATIONS

*Chemical Force Microscopy*, A. Noy et al, Annual Review of Materials Science; vol. 27, 1997; pp. 381–421.
*Escherichia coli RNA Polymerase Activity Observed Using Atomic Force Microscopy*, S. Kasas et al., BioChemistry vol. 36, No. 3, Jan. 21, 1997; pp. 461–468.
*Scanning Force Microscopy Under Aqueous Solutions*, C. Bustamante et al., Biophysical Methods; pp. 709–716.
*Scanned Probe Microscopies In Chemistry*, R.J. Hamers, American Chemical Society; 1996; pp. 13103–13120.
Paul West, "Atomic Imaging Coming of Age", *R & D Magazine*, Nov. 1997, p. 47.

* cited by examiner

Primary Examiner—John R. Lee
(74) Attorney, Agent, or Firm—Morgan & Finnegan, LLP

(57) ABSTRACT

An atomic force microscope utilizes a pulse release system and improved method of operation to minimize contact forces between a probe tip affixed to a flexible cantilever and a specimen being measured. The pulse release system includes a magnetic particle affixed proximate the probe tip and an electromagnetic coil. When energized, the electromagnetic coil generates a magnetic field which applies a driving force on the magnetic particle sufficient to overcome adhesive forces exhibited between the probe tip and specimen. The atomic force microscope includes two independently displaceable piezo elements operable along a Z-axis. A controller drives the first Z-axis piezo element to provide a controlled approach between the probe tip and specimen up to a point of contact between the probe tip and specimen. The controller then drives the first Z-axis piezo element to withdraw the cantilever from the specimen. The controller also activates the pulse release system which drives the probe tip away from the specimen during withdrawal. Following withdrawal, the controller adjusts the height of the second Z-axis piezo element to maintain a substantially constant approach distance between successive samples.

42 Claims, 6 Drawing Sheets

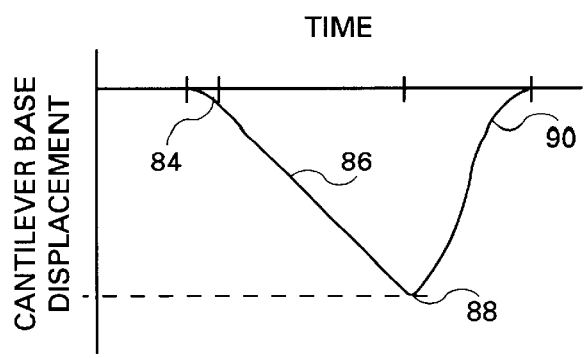
FIGURE 5a
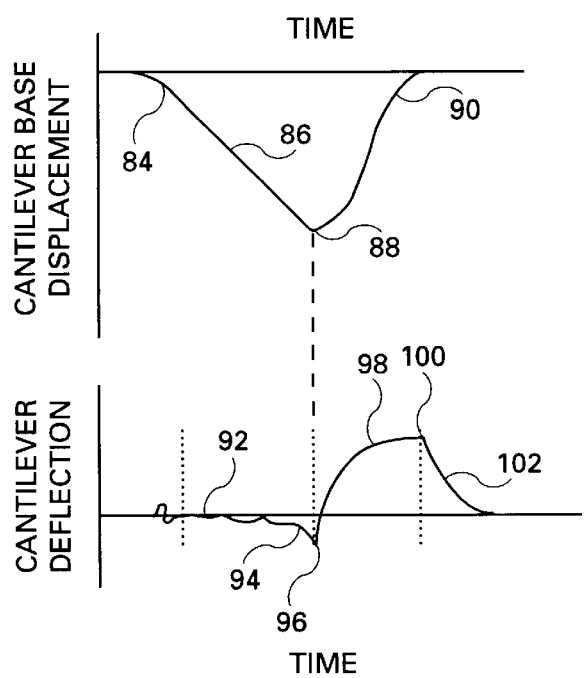
FIGURE 5b
FIGURE 5c
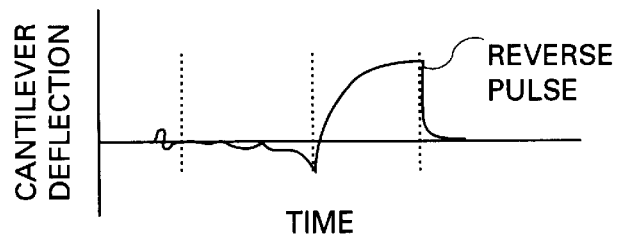
FIGURE 5d

SENSING MODE ATOMIC FORCE MICROSCOPE

This invention was made with Government support under contract number DE-AC02-98CH10886, awarded by the U.S. Department of Energy. The Government has certain rights in the invention.

BACKGROUND OF THE INVENTION

The present invention relates generally to atomic force microscopy and more particularly relates to an atomic force microscope and controller which minimize contact forces between a probe tip and a specimen and is well suited for the study of biological specimens.

In the study of biology, it is desirable to observe biological specimens under very high magnification in a native environment. Such observations allow scientists to monitor, in real time, biological processes at the molecular and sub-molecular level. Such processes include the interaction of proteins with DNA and with each other. Currently, these processes cannot be observed in real time with electron microscopes or x-ray crystallography techniques which are known in the art, as the specimens are not in their native environment when using these apparatuses. Accordingly, scientists have sought alternate methods to observe biological specimens. One such alternative is known as the atomic force microscope.

Atomic force microscopes (AFM), which are generally known in the art, physically probe a specimen to create an image of the specimen's surface. FIG. 1 illustrates a typical embodiment of an AFM known in the art. The AFM has two primary components, a scanner 10 and a flexible cantilever 12 having a probe tip 14 on a free end. The scanner 10 has a top surface 16 on which a specimen 18 to be imaged is placed. The scanner 10 typically employs three piezoelectric elements 20, 22, 24 to move the specimen 18 in three dimensions, X, Y and Z, relative to the position of the probe tip 14. The probe tip 14 is affixed to the free end of the flexible cantilever 12 and contacts the specimen 18. The AFM includes a laser 26 directed onto the cantilever 12 and a photo detector 28 which is responsive to laser light to measure the deflection of the cantilever 12. As the degree of cantilever deflection is proportional to the contacting force between the probe tip 14 and the specimen 18, such force can accurately be calculated based on the angle of cantilever deflection.

To create an image of a specimen, the scanner 10 directs the specimen 18 in a raster-scan fashion in the X-Y direction while continuously sampling the contour of the specimen 18 in the Z direction. The sampling is generally performed using one of two techniques known in the art, namely contact mode or tapping mode®. (Tapping mode is a registered trademark of Digital Instruments, Inc. of Santa Barbara, Calif.)

In contact mode, the scanner 10 is controlled in the Z direction such that the contacting force between the probe tip 14 and the specimen 18 is substantially constant. As the contour of the specimen changes, the deflection of the cantilever 12 also changes and a servo system driving the scanner 10 adjusts the Z coordinate of the scanner 10 to restore the desired constant force. At each specimen point, the coordinate of the Z axis is indicative of the specimen contour. Because the probe is constantly contacting the surface of the specimen during the X-Y raster scan, significant lateral forces are applied to both the specimen 18 and the probe tip 14. The probe tip 14, which is typically 200–300 angstroms (Å) in diameter is subject to rapid wear and breakage under these forces. Also, when used on soft specimens, such as biological specimens, the probe tip is likely to destroy the surface of the specimen, making accurate and repeatable measurements impossible.

In tapping mode®, the cantilever 12 is driven in an oscillatory fashion at the resonant frequency of the cantilever. This may be achieved by affixing the cantilever to a piezoelectric element 30 and driving the piezoelectric element 30 with a voltage signal at the resonant frequency of the cantilever. To determine the contour of the specimen in tapping mode®, the scanner 10 moves the specimen in the Z direction until a predetermined reduction in oscillation amplitude is detected. The reduction in oscillation amplitude is the result of the probe tip 14 contacting the surface of the specimen 18 during each cycle of oscillation. Because the probe tip 14 only momentarily contacts the specimen 18 during the X-Y raster scan, the lateral force present during contact mode is substantially reduced. However, because the probe tip 14 is moving rapidly on arrival at the specimen surface, the contacting force, while short in duration, is large in magnitude. The force that results from tapping modes tends to be destructive to biological specimens. Thus tapping modes is most useful in sampling hard surfaces, such as those found in integrated circuit manufacturing processes and the like. Also, tapping mode® is difficult to use when measuring a fluid based specimen. When the cantilever assembly is submerged into a fluid environment, the desired oscillation of the cantilever can be dampened and additional resonances are developed which can adversely affect operation and accuracy. Also, fluid flow induced by the tapping oscillation tends to erode the specimen. Because biological specimens tend to reside in a fluid environment, tapping mode is not well suited for measuring these specimens.

An alternative operating mode to both contact mode and tapping mode® is described in U.S. Pat. No. 5,229,606 to Elings et al. Elings et al. describe what the inventors refer to as "jump scanning." In jump scanning, the probe is momentarily brought into contact with the surface to be measured. The probe is then lifted away from the surface as the specimen is moved in the X direction and the probe tip is then brought back down into contact to take the next specimen. By jumping over the surface of the specimen, Elings et al. teach a method of increasing scanning speed with reduced risk of probe damage. However, when the probe tip and specimen contact one another, an attractive force tends to hold the probe tip in contact with the specimen. To ensure that the probe tip is able to release, the cantilever 12 must be formed with a sufficient spring constant to overcome this attractive force. Unfortunately, increasing the spring constant of the cantilever 12 increases the magnitude of the contact force between the probe tip 14 and specimen 18 which is required to achieve a measurable cantilever 12 deflection. Such stiff cantilevers, i.e., in the range greater than 0.1 Newtons per meter (N/M), which are required for jump mode, are incompatible with the more sensitive biological specimens which are easily damaged under the application of such forces.

The problem of overcoming the attractive forces between an AFM probe tip 14 and specimen surface was addressed in U.S. Pat. No. 5,515,719 to Lindsay. Lindsay recognized that when soft (low spring constant) cantilevers are used, the adhesive interaction between the specimen 18 and probe tip 14 tends to draw the probe tip in and the probe tip 14 will stick to the surface until enough force is applied to the cantilever base to release the probe tip 14. To address this problem, Lindsay teaches the addition of a magnetic particle attached to the cantilever in combination with a magnetic solenoid located proximate to the cantilever. The solenoid generates a magnetic field which is variable and precisely regulated by a servo circuit. The servo circuit monitors the deflection of the cantilever and continuously adjusts the magnetic field such that the attractive force between the probe tip 14 and specimen 18 is substantially neutralized. In this way, the probe tip 14, as taught by Lindsay, never makes adhesive contact with the specimen. However, in order to operate in a stable fashion, the servo circuit taught by Lindsay must precisely neutralize the attractive force, otherwise instability may result.

The use of a magnetic particle affixed to a flexible cantilever and controlled by a magnetic coil as used by Lindsay was first disclosed in an article by Florin et al., entitled "Atomic Force Microscope with Magnetic Force Modulation", published in the Review of Scientific Instrument, 65(3), March 1994. Florin et al. teach the use of the magnetic control system to drive the cantilever in an oscillating fashion such that the probe tip momentarily contacts a specimen, in a manner similar to tapping mode®.

Current AFM techniques tend to be destructive to biological specimens. Therefore, there remains a need for an improved atomic force microscope adapted for use in a fluid medium for the observation of biological specimens in their native environment.

OBJECTS AND SUMMARY OF THE INVENTION

It is an object of the present invention to provide an atomic force microscope suitable for use with biological specimens in their native environment.

It is another object of the present invention to provide an atomic force microscope which provides a controlled, angstrom by angstrom approach of the probe tip to the specimen.

It is yet another object of the present invention to provide an atomic force microscope which applies minimal vertical force to the specimen being measured.

It is still another object of the present invention to provide an atomic force microscope featuring substantially zero lateral force applied to the specimen during a raster scan.

It is a further object of the present invention to provide an atomic force microscope with a low spring force cantilever which overcomes the problem of probe tip retention resulting from adhesive forces between the probe tip and specimen.

It is still a further object of the present invention to provide an atomic force microscope capable of using a probe tip with a diameter less than 100 angstroms.

It is still another object of the present invention to provide an atomic force microscope which is able to generate repeatable scan to scan measurement results on biological specimens.

It is yet another object of the present invention to provide an atomic force microscope suitable for monitoring biological processes in real time.

It is still another object of the present invention to provide an atomic force microscope which substantially continuously monitors both cantilever displacement relative to a specimen and cantilever deflection.

It is yet another object of the present invention to provide an atomic force microscope which is responsive to changes in cantilever deflection within five microseconds.

It is yet a further object of the present invention to provide an atomic force microscope capable of recording and outputting complete force curves for all pixels in a specimen scan.

In accordance with the present invention, an atomic force microscope (AFM) is provided which addresses the problems known in the prior art for the measurement of biological specimens. The AFM includes a scanner which further includes a specimen surface which is independently moveable along three mutually perpendicular coordinate axes, X, Y and Z. The AFM also includes a compliant cantilever having a probe tip affixed to a free end. The scanner moves the specimen to be imaged relative to the probe tip.

The cantilever has a second end, opposite the free end, which is affixed to a vertically displaceable cantilever base. The cantilever base is responsive to a received approach signal from a controller and moves the cantilever towards or away from the specimen surface along the Z axis. A magnetic particle is affixed to the cantilever proximate the free end. The magnetic particle is responsive to a magnetic field generated by a coil which is energized by the controller. The magnetic particle and coil are arranged such that the magnetic field drives the free end of the cantilever away from the surface of the specimen when tip release is desired.

The atomic force microscope further includes a laser light source which is directed onto the cantilever. A segmented photo sensor receives the laser light reflected from the cantilever and provides a signal which is proportional to cantilever deflection. The signal is provided to the controller to determine the force applied to the probe tip.

The previously described atomic force microscope is preferably operated in accordance with a method of the present invention. The controller increments the X and Y scanner coordinates to effect a raster scan. At each X, Y coordinate, the controller provides an approach signal to move the cantilever base towards the specimen surface. The controller periodically monitors the cantilever deflection during approach and determines when contact has been established between the probe tip and the specimen. When contact is detected, the approach signal reverses, affecting a withdrawal of the cantilever base from the specimen. To disengage the probe tip from the surface of the specimen, the controller initiates a pulse release signal which is applied to the coil. The coil generates a magnetic field which drives the magnetic particle and cantilever tip away from the specimen. The controller monitors cantilever deflection to ensure that the probe tip has released from the specimen. If not, the magnitude of the pulse release signal is increased by the controller and is reapplied to the coil. Alternately, the controller can request intervention by the operator to increase the pulse size for this experiment. While ensuring that the probe tip is clear of the specimen surface, the controller continues to withdraw the cantilever base and increments the scanner to the next X-Y coordinate.

In accordance with another method of the present invention, an AFM is operated in a manner which provides a substantially constant approach distance for successive samples independent of specimen topology. To insure a substantially constant approach distance with varying surface topology, the controller of the present invention compares the last approach value to a predetermined set point. If the approach value is not equal to the set point, the controller drives a Z-axis displaceable element to minimize the error for the next approach. The Z-axis displaceable element can be in the scanner or cantilever base. In this way, the range of cantilever base motion remains substantially constant from scan to scan even with changes in specimen topology.

For better understanding of the present invention, together with other and further objects and advantages, reference is made to the following description, taken in conjunction with the accompanying drawings, and its scope will be pointed out in the appended claims.

BRIEF DESCRIPTION OF THE DRAWINGS

FIG. 5A is a graph depicting the full range of cantilever base motion;

FIG. 5B is a graph depicting cantilever base motion truncated by the detection of probe tip contact;

FIG. 5C is a graph depicting cantilever deflection versus time and corresponds in time with the graph in FIG. 5B; and FIG. 5D is a graph depicting cantilever deflection versus time with the application of a reverse polarity pulse release signal, restoring the cantilever to a neutral position.

DETAILED DESCRIPTION OF THE INVENTION

Figure 1:
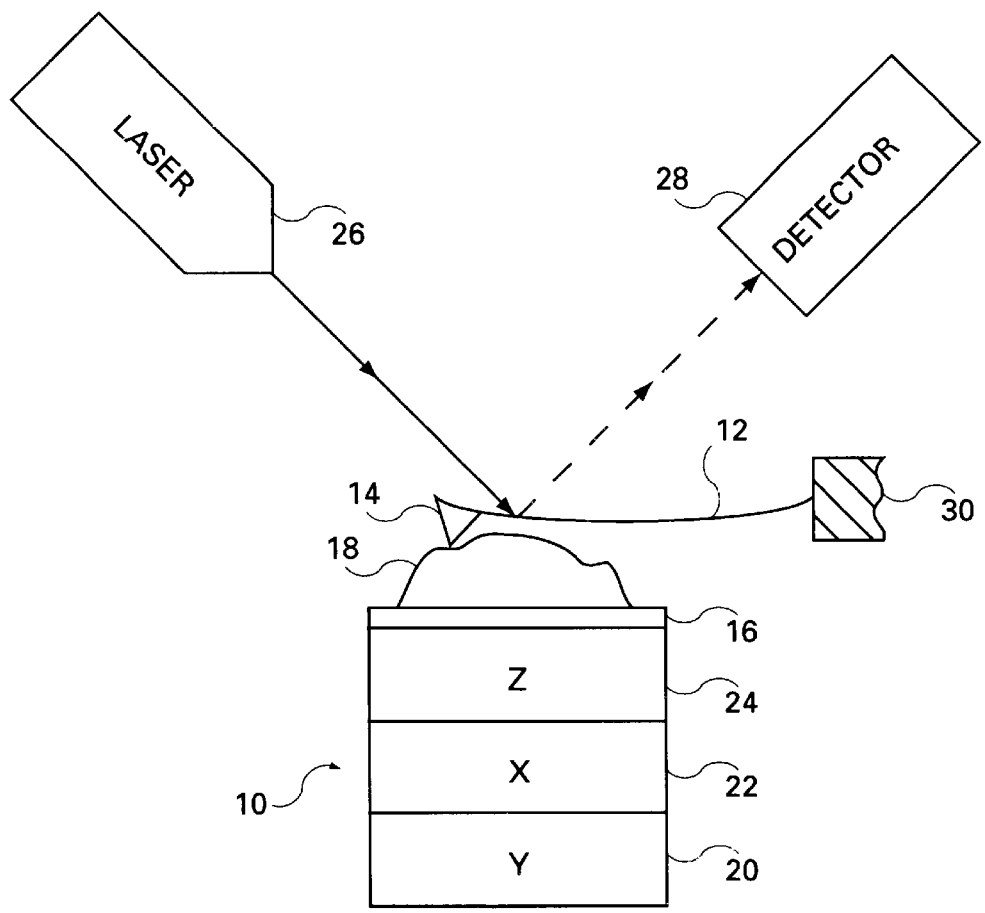
FIG. 1 is a block diagram of an atomic force microscope formed in a manner known in the prior art.
Figure 2:
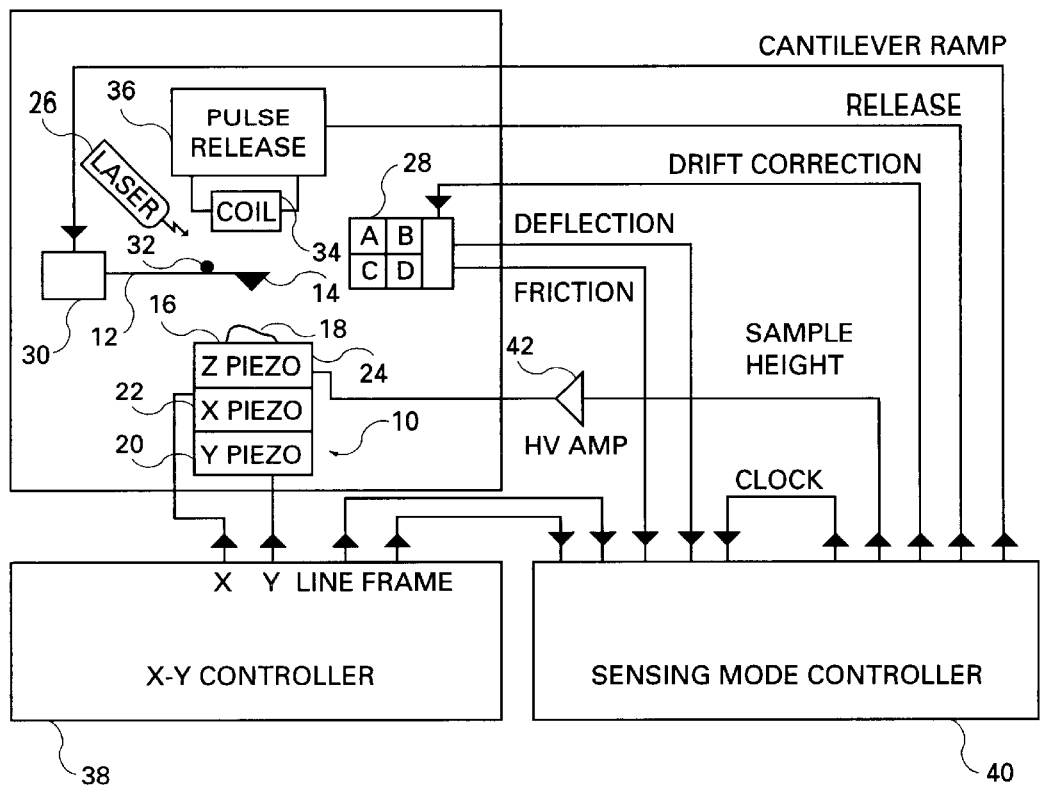
FIG. 2 is a block diagram of a sensing mode atomic force microscope formed in accordance with the present invention.

FIG. 2 is a block diagram generally depicting an atomic force microscope (AFM) formed in accordance with the present invention. The AFM includes a scanner 10 formed in a conventional manner having an X-piezo element 20, a Y-piezo element 22 and a Z-piezo element 24. The scanner 10 has an upper specimen surface 16 on which a specimen 18 to be measured is placed. The X, Y and Z piezo elements each change dimension, in a conventional fashion, in three mutually perpendicular axes, in response to a received control voltage signal. An X-Y controller circuit 38 is included. The X-Y controller circuit 38 controls the X-piezo element 20 and the Y-piezo element 22, generating a conventional raster scan of the specimen surface 16. Several commercially available controllers can provide this function. For example, the NanoScope E controller, manufactured by Digital Instruments, Inc. of Santa Barbara, Calif. is suitable for this application.

A sensing mode controller circuit 40 is also included and controls the Z-piezo element 24 in accordance with a method of the present invention. The sensing mode controller 40 can be implemented using a Pentium® II Personal Computer and a DT3809 multifunction Input/Output Card, having a Texas Instruments C40 Digital Signal Processor Integrated Circuit. It is contemplated by the inventors, and will be appreciated by those skilled in the art, that the functions of the X-Y controller circuit 38 and sensing mode controller circuit 40 can be performed by a single controller unit.

The AFM further includes a flexible cantilever 12 which has a first end affixed to a vertically displaceable (Z-axis) cantilever base 30. The cantilever base 30 preferably takes the form of a piezoelectric element which changes dimension in the Z-axis in a controlled fashion in response to a received control voltage signal provided by the sensing mode controller circuit 40. The flexible cantilever 12, shown in detail in FIG. 3, has a free end on which a probe tip 14 is affixed. The probe tip 14 is formed from a material such as silicon nitride and is generally sharpened to a diameter less than 200 angstroms. Suitable probe tips are currently manufactured by Digital Instruments of Santa Barbara, Calif.

During a specimen measurement, the probe tip 14 is brought into contact with the specimen and a force results which deflects the flexible cantilever 12. The magnitude of the force applied by the probe tip 14 onto the specimen 18 is proportional to the angle of cantilever 12 deflection. To measure the degree of cantilever deflection; the AFM further includes the laser source 26 which generates a light signal that is directed onto the surface of the flexible cantilever 12. The light signal is reflected from the cantilever 12 and is directed by a mirror (not shown) onto a photo detector 28. The photo detector 28 is preferably divided into four light responsive quadrants, a, b, c and d. Each light responsive quadrant generates an analog voltage signal which is proportional to the magnitude of reflected light incident upon it. A difference signal, which is equal to the signals (a+b)−(c+d), is calculated to determine the magnitude of deflection of the cantilever 12.

The scanner 10, cantilever 12, cantilever base 30, laser 26 and photo detector 28 are conventional elements known in the art. These components are sold as an assembly by Digital Instruments of Santa Barbara, Calif. under the trademark, MultiMode SPM.

As the probe tip 14 approaches a specimen, repulsive forces act upon the probe tip 14 owing to an effective viscosity increase of the fluid near the surface.

Figure 3:
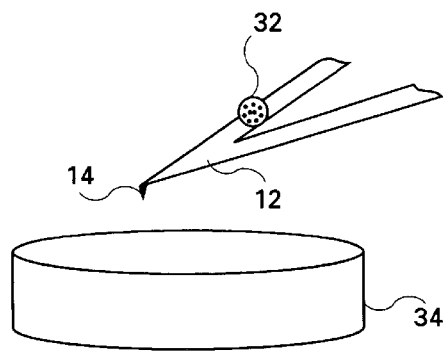
FIG. 3 is a perspective view of a cantilever and cantilever pulse release system, formed in accordance with the present invention.

When the probe tip 14 contacts the surface of the specimen, adhesive forces frequently result which capture and retain the probe tip 14. This problem is exacerbated when the cantilever 12 is formed with a very low spring constant, which is required for the measurement of biological specimens. Therefore, an important aspect of the present invention resides in the ability to disengage the probe tip 14 from the surface of the specimen. To accomplish this, a magnetic particle 32 is affixed proximate the free end of the cantilever 12, as illustrated in FIG. 3. In a preferred embodiment, the magnetic particle is formed by bonding a particle of Samarium Cobalt to the cantilever 12 with a thermal epoxy. The particle can be previously magnetized by placing it in a magnetic field of approximately 3.5 Tesla.

The AFM also includes an electromagnetic coil 34 which receives current drive from a pulse release circuit 36 and generates an inhomogeneous magnetic field in response thereto. The magnetic particle 32 and electromagnetic coil 34 are arranged such that the magnetic field generated by the coil 34 when energized drives the magnetic particle 32 away from the surface of the specimen 18. Preferably, the coil 34 is formed and placed proximate the scanner 10 and the magnetic field is selected to repel the magnetic particle 32. In other embodiments, the coil can be placed above the cantilever 12 and generate an attractive magnetic force with the magnetic particle 32. In either placement, an opposite force used for restoring the cantilever 12 to a neutral position, can be generated by reversing the polarity of the current in the coil. The magnetic force is selected to be sufficient to overcome the adhesive force between the probe tip 14 and specimen 18. Such a force is generally achievable when the coil is formed with 50 turns of 22 gauge wire about a 0.25 in. diameter core, and is energized with a current on the order of 200 milliamps. However, as the adhesive forces encountered are variable, it is preferred that the level of magnetic field also be variable to insure that the probe tip 14 can always be released from the specimen 18.

To achieve the desired objectives, the present invention employs a novel control method for an atomic force microscope, such as that illustrated in FIG. 2. The control method, which generally takes the form of a computer program, is illustrated in the flow charts of FIGS. 4A–C. The control method of FIGS. 4A–C results in a controlled approach of the probe tip 14 to the specimen 18, a substantially constant range of motion of the probe tip 14 during successive measurement samples, very low contact force upon the probe tip 14 with no lateral force resulting between the probe tip 14 and specimen 18 and a sure release of probe tip 14 from adhesive forces presented by the specimen 18. Accordingly, the method of the present invention is ideal for use when working with biological specimens.

Figure 4A:
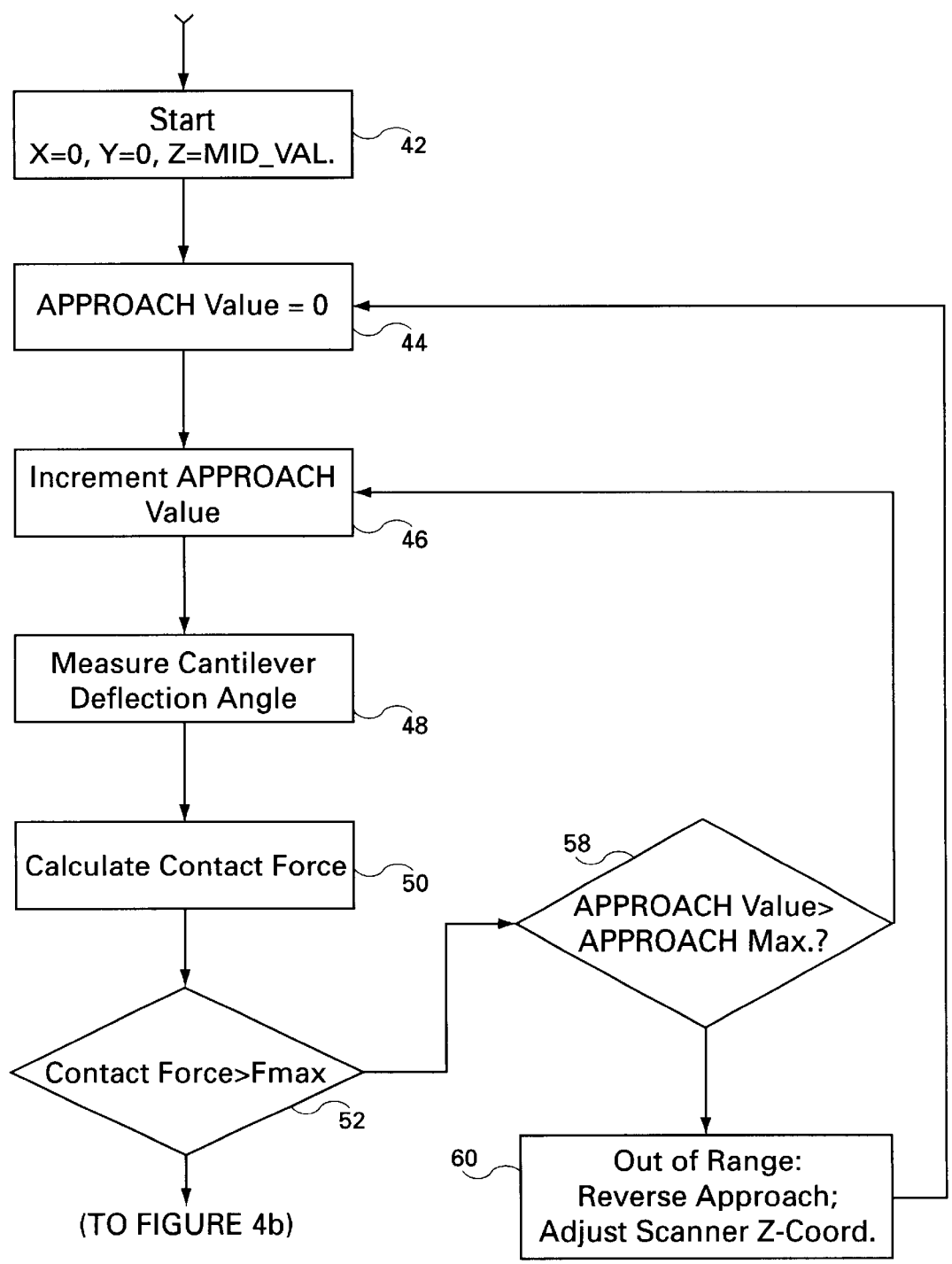
FIGS. 4A–C are flow charts illustrating the operation of a sensing mode atomic force microscope formed in accordance with a method of the present invention.
Figure 4B:
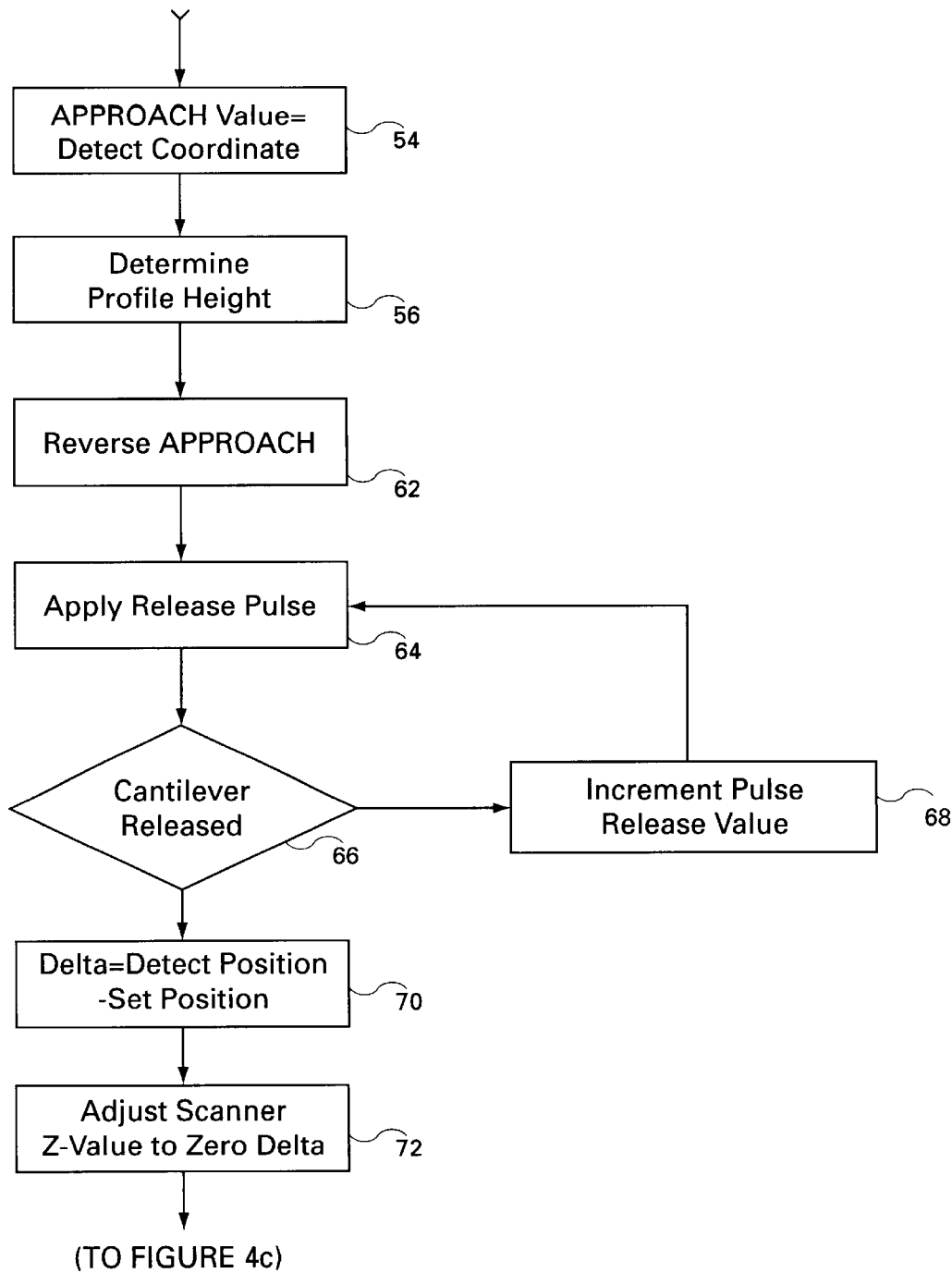
Figure 4C:
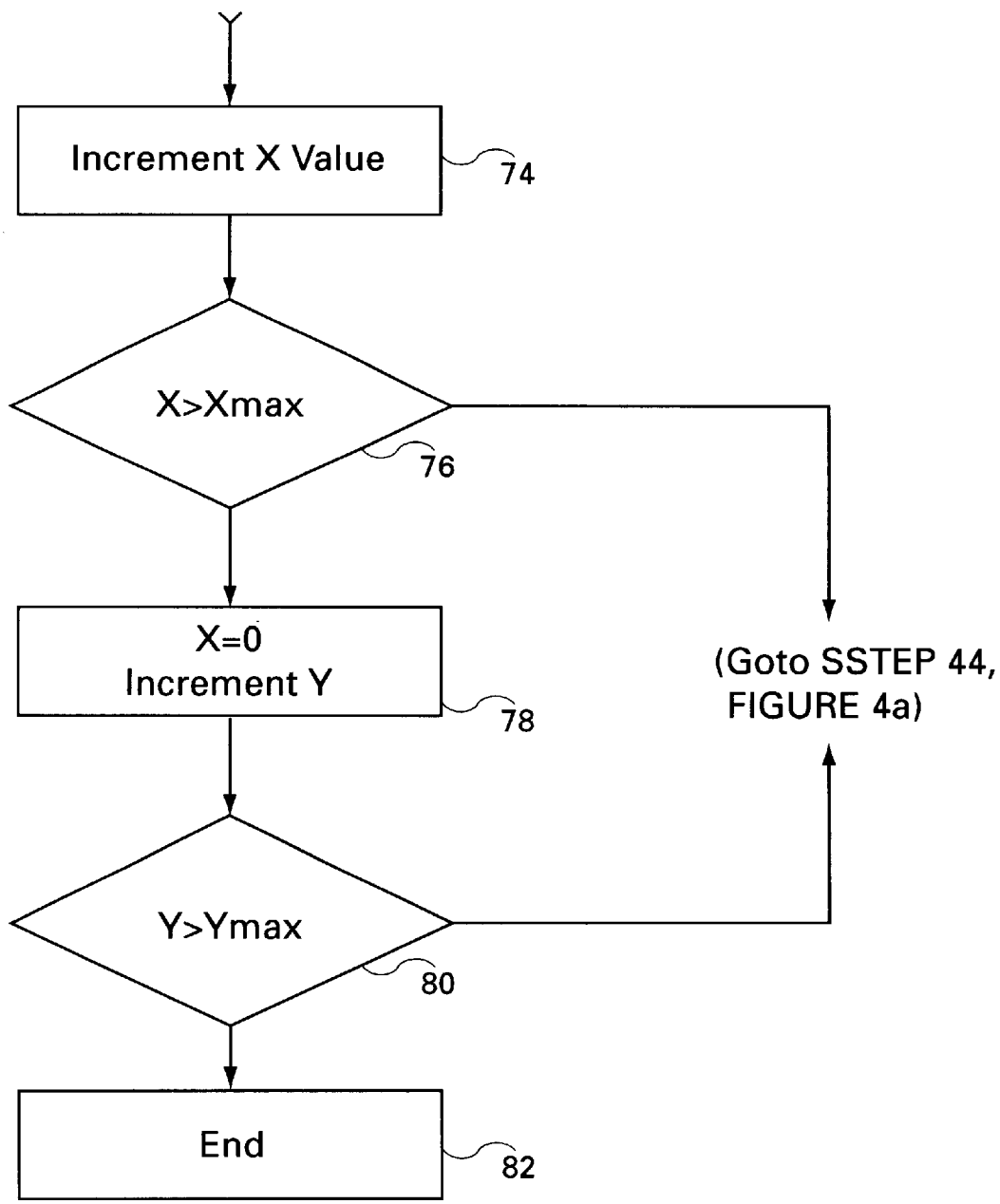

Referring to FIGS. 4A–C, operation of the AFM begins with the initialization of the X, Y and Z positions of the scanner 10 (step 42). The X and Y piezo elements are driven to a datum coordinate (0,0) and the Z-piezo element 24 is placed approximately in the center of the range of motion. The approach value, which is provided by the sensing mode controller 40 to the cantilever base 30, is also initialized to zero (step 44).

After initialization, the sensing mode controller circuit 40 increments the approach value, thereby moving the cantilever base 30 in a direction towards the specimen surface 16 (step 46). After incrementing the approach value, the sensing mode controller 40 monitors the signals from the photo detector 28 and determines the cantilever 12 deflection angle (step 48). From the measured deflection angle, the sensing mode controller 40 calculates the force on the probe tip 14 (step 50). The sensing mode controller 40 then compares the measured force against a predetermined maximum force value to determine whether the probe tip has contacted the specimen (step 52). The maximum force value is preferably selected to be the minimum value which will reliably indicate a contacting force between the probe tip 14 and specimen. A suitable threshold of 150 Pico Newtons (pN) has been successfully practiced, with significantly lower threshold values considered achievable as significantly softer cantilevers become commercially available.

If the probe tip 14 has contacted the specimen, the approach value is stored as the detection coordinate to calculate the profile height of the specimen (step 54). The specimen profile height is then determined by combining the current Z coordinate position of the scanner 10 with the detection coordinate (step 56). At contact, a lower Z-value for scanner 10, and a lower detection coordinate on the ramp, each signifies a higher profile height. So these two variables must be added (after multiplying each by a constant to convert digital value to height) and finally the sign changed. The specimen profile height value represents the height of the specimen at the current X, Y position and can be displayed graphically as the intensity and/or color of a pixel at that two dimensional coordinate, in a manner well known in the art of atomic force microscopy.

Returning to step 52, if the probe tip 14 has not contacted the specimen, the controller then determines whether the approach value has exceeded an allowable limit (step 58). The range of approach values is determined by the required force resolution and the range of motion achievable from the cantilever base 30. Preferably, a digital to analog converter within the sensing mode controller 40 provides at least 200 incremental approach values as illustrated in FIG. 5A (approach maximum=200). This allows an angstrom by angstrom approach of the cantilever base 30 toward the specimen. If the approach value is within the acceptable range, the program returns to step 46 where the approach value is incremented.

Steps 46–52 and step 58 are performed in such a way as to generate a controlled approach of the cantilever base 30 towards the specimen 18, as illustrated in the graphs of FIGS. 5A and 5B. The approach begins with a gradually descending portion 84. The curved initial approach, which can be generated by a sinusoidal function or other suitable function, minimizes the initial acceleration of the cantilever base 30. This minimizes the excitation of oscillations in the free end of the cantilever 12 and enhances measurement accuracy. The approach then is characterized by a linear segment 86. The linear approach of the present invention together with a minimum practical approach distance minimizes the velocity of the cantilever at contact and allows the probe tip 14 to contact the specimen with minimal contact force.

If the approach value exceeds the maximum value (step 58 is true) the sensing mode controller 40 withdraws the cantilever base and applies a signal to the Z-piezo element 24 of the scanner 10 to reduce the separation between the cantilever base 30 and specimen surface 16. A high voltage amplifier 42 is preferably interposed between the sensing mode controller 40 and scanner 10 to generate the ±200 volt signal required to drive the piezoelectric element. A suitable high voltage amplifier, model number PA87, is manufactured by Apex Microtechnology of Tucson, Ariz. After adjusting the scanner height (step 60), program control is directed to step 44 where the approach value is again initialized to zero.

After the probe tip 14 contacts the specimen 18, adhesive forces act to hold the probe tip in place, even when the cantilever base 30 and specimen 18 are moved away from each other. This problem is especially acute when soft cantilevers (k<0.1 N/M) are used. The method of the present invention overcomes this problem by coordinating the withdrawal of the cantilever base 30 with the application of a force on the probe tip 14.

After the specimen profile height is determined (step 56), the magnitude of the approach signal is reduced, thereby moving the cantilever base 30 away from the specimen (step 62). Preferably, the approach signal is initially reduced gradually to effect a gradual change in slope (88, FIG. 5A), thus avoiding instability of the cantilever 12. In order to release the probe tip 14 from the specimen 18 when the cantilever base 30 starts to withdraw, the sensing mode controller 40 applies a pulse release signal to the pulse release circuit 36.

In response to the pulse release signal, the pulse release circuit 36 generates a suitable current pulse which energizes to the electromagnetic coil 34. The electromagnetic coil 34 generates a magnetic field which repels the magnetic particle 32, and thus the probe tip 14, away from the specimen 18. The sensing mode controller circuit 40 monitors the deflection angle of the cantilever to ensure that the probe tip 14 in fact is released (step 66). If not, the sensing mode controller circuit 40 either requests intervention by the operator to increase the pulse size for this experiment or increments the value of the release pulse release signal (step 68) and reapplies the pulse (step 64). When the sensing mode controller circuit 40 is adjusting the pulse release signal, steps 64–68 are repeated until the magnetic force overcomes the adhesive force between the specimen 18 and the probe tip 14 or a predetermined maximum pulse release signal is reached.

FIG. 5C illustrates exemplary cantilever deflection versus time for the approach depicted in FIG. 5B. During the linear portion of the approach 86 the cantilever 12 experiences little deflection from a neutral position 92. Depending on the material being sampled and the construction of the probe tip 14, attractive forces may be present which draw the probe tip into the specimen. This results in a negative deflection 94 of the cantilever 12. Upon contact of the probe tip 14, the cantilever 12 begins positive deflection 96. This is the condition detected by the sensing mode controller 40 at step 52. At that point the cantilever base 30 is withdrawn and the pulse release signal is applied, deflecting the cantilever 12 in a positive direction 98. Because the cantilever 12 is operating in a fluid environment, the cantilever deflection 98 is damped and is characterized by an exponential function. Upon termination of the release pulse 100, the cantilever returns to the neutral position in an exponentially decaying fashion 102. In order to accelerate the return to the neutral position, a reverse polarity pulse signal can be applied to the coil 34. This creates an attractive force sufficient to overcome the spring constant of the cantilever 12 as well as the fluid damping. An example of this is illustrated in FIG. 5D.

After the probe tip 14 is released and the approach signal is decremented to zero (90, FIG. 5B), the program determines the distance traveled by the cantilever base 30 during the last sample. Since it is preferable for limiting the contact force on the specimen during measurement to use a minimum practical approach distance, the specimen height change that can be stored in the variable representing the detect position is limited. Therefore, the sensing mode controller circuit 40 generates a delta value by subtracting a predetermined "set value" from the actual value traveled by the cantilever base 30 during the last approach (step 70). The set value is normally chosen near the midpoint of the linear ramp of FIG. 5A. The sensing mode controller 40 then adjusts the height of the Z-piezo element 24 of the scanner 10 to reduce the delta value to zero on the next approach (step 72). In this way the Z-piezo element 24 functions as the accumulator or integrator of deltas generated by the detect position. The range of heights that can be generated by the Z-piezo element 24 is several thousand nanometers, which is entirely adequate for the range of specimen heights encountered in biological experiments. A useful by-product of this method of operation is the achievement of substantially constant timing and substantially constant distance of travel in the approach of the cantilever base 30 to the specimen 18 during successive samples.

While the method of FIGS. 4A–C has been described with the cantilever base 30 being controlled to effect the approach and withdrawal of the probe tip 14 and the scanner 10 being controlled to minimize the delta value, those skilled in the art will readily appreciate that these functions can be exchanged without deviating from the improved methods of the present invention. To effect such a change, the range of motion of the cantilever base 30 is preferably increased from several hundred nanometers which is commonly used, to several thousand nanometers so that a broad range of delta values can be corrected.

Upon completion of step 72, the X-Y controller 38 then operates to effect a conventional raster scan of the specimen relative to the probe tip 14. The X-Y controller 38 increments the X coordinate value (step 74) of the scanner 10 and determines whether the end of the rbw has been reached (step 76). Typically, each row contains either 256 or 512 coordinate values. If the end of the row has not been reached, the program control returns to step 44. If the end of the row has been reached, the X coordinate value is reset to zero and the Y coordinate value is incremented (step 78). Alternatively, the program can increment the Y coordinate value and decrement the X coordinate value for successive measurements until X=O. In this way, a serpentine scan is achieved. The X-Y controller 38 then determines if the final Y coordinate value has been reached (step 80). Generally, the Y axis will include the same number of coordinate values as the X-axis, thereby generating a square image matrix. If the final Y coordinate value has not been reached, control returns to step 44. If the final Y coordinate value has been reached, the image scan is complete and the program ends (step 82).

The process just described is referred to by the inventors as "sensing mode." This is because the sensing mode controller 40 senses when initial contact is made between the specimen and probe tip 14 and immediately (typically within 5 microseconds) begins retraction of the cantilever base 30 and probe tip 14. The method and apparatus of the present invention significantly reduces the velocity of the probe tip 14 at contact with the specimen 18 and therefore reduces the resulting contact force between the probe tip 14 and the specimen 18. By reducing the contact force, specimen destruction is minimized. The inclusion of the magnetic particle 32 and pulse release coil 34, operated in accordance with the sensing mode method of the present invention, allows the use of a cantilever 12 with a spring constant significantly less than 0.1 Newtons per meter (N/M) without the risk of the probe tip 14 being retained by the adhesive forces exhibited by the specimen. With sensing mode, the lower limit on acceptable cantilever spring force is bounded only by cantilever manufacturing constraints. The use of such a soft cantilever further reduces the force between the probe tip 14 and the specimen 18 during contact.

As an additional benefit of the significantly reduced contact force, significantly smaller probe tips 14 can be used in sensing mode with reduced risk of tip breakage. While not yet commercially available, it is expected that probe tips significantly less than 100 angstroms in diameter can readily be used with the sensing mode scanning method of the present invention.

As a further advantage resulting from the continuous sensing process of sensing mode, a high-speed algorithm can compute a running linear least squares fit for as many as 20 or more successive readouts of the cantilever deflection signal (angle), with update of the least squares fit each 5 microseconds as a new digital value for deflection value is presented to the program. Thus, continuous sensing makes possible a low-noise running fitted average to both tip position and tip velocity (slope of the least squares fit). Because the averaging time of the fit can extend over several cycles of the damped vibrational period of the cantilever, thermal noise in the averaged cantilever signal is strongly reduced and noise in the detected position of the surface is lowered correspondingly. The running least squares fit can be used in a variety of sensitive algorithms for detecting contact with the surface at low force. One such is to define contact with the surface as that point during the approach where the velocity of the tip, which is the same as the slope of the least squares fit, changes from negative (down) to positive (up). Tests with this definition have shown an ability to detect the surface with substantially smaller force exerted on the specimen.

An atomic force microscope formed and operated in accordance with the present invention can be used to reduce the time for the cantilever to approach an equilibrium angle at certain phases of the approach/withdraw cycle. By applying a reverse current pulse in the magnetic drive coil at the termination of the cantilever pulse release signal, the return of the cantilever to its equilibrium angle is accelerated so the next approach can begin immediately. A brief current pulse of the same sign as the main release pulse but at the beginning of the main approach ramp speeds up arrival at the new equilibrium angle associated with linear approach, simplifying subsequent detection of the surface.

While there have been described what are presently believed to be the preferred embodiments of the invention, those skilled in the art will realize that various changes and modifications may be to the invention without the departing from the spirit of the invention, and it is intended to claim all such changes and modifications as fall within the scope of the invention.

What is claimed is:

1. A microscope for determining the characteristics of the surface of a specimen, the microscope comprising:
    a flexible cantilever having a first end and a second end;
    a probe tip, said probe tip being affixed to said cantilever proximate said first end;
    a displaceable cantilever base, said cantilever base being displaceable along a Z axis, said cantilever being affixed to said cantilever base proximate said second end;
    a scanner for generating relative motion between said probe tip and the specimen, said scanner being displaceable along an X, a Y and the Z axes;
    a deflection detector for measuring an angular deflection of said cantilever;
    a probe tip release system for incrementally applying an increasing momentary force to said cantilever first end after said probe tip has contacted said specimen, until said momentary force overcomes an adhesion force between said probe tip and the specimen; and
    a controller having a processor, said controller providing control signals to the cantilever base and scanner to effect a relative motion between said probe tip and said specimen in an incremental basis, said controller sampling the deflection detector on approach increments to determine if probe tip contact occurred during a last increment, effecting an initial Z-axis withdrawal of one of said cantilever base and scanner following the probe tip contact occurrence and signaling the probe tip release system to initiate the applying the increasing momentary force.

2. A microscope as defined in claim 1, wherein said probe tip release system comprises:
    a magnetic particle affixed proximate said cantilever first end; and
    an electromagnetic coil, said coil generating a magnetic field in response to a received signal from said controller, the magnetic field providing the momentary force on said cantilever.

3. A microscope for determining the characteristics of the surface of a specimen, the microscope comprising:
    a flexible cantilever having a probe tip affixed proximate to a free end;
    means for effecting relative X, Y and Z axis motion between said probe tip and the specimen;
    means for making an incremental approach of the probe tip towards the specimen, detecting an increment in which a contact between said probe tip and the specimen occurs, and stopping the incremental approach upon the contact; and
    means for applying a magnetic force to said probe tip, following the contact, sufficient to identify and overcome an adhesion force exhibited between said probe tip and the specimen due to the contact.

4. A microscope as defined by claim 3, wherein said means for applying a force to said probe tip further comprises:
    a magnetic particle affixed proximate said cantilever free end; and
    and electromagnetic coil, said coil generating a magnetic field in response to a received signal from said detecting means.

5. A microscope as defined by claim 4, wherein said means for effecting relative motion includes:
    a first piezo-electric element displaceable along a z-axis; and
    a second piezo-electric element displaceable along the z-axis, independently of the first piezo-electric element, one of said first and second piezo-electric elements being displaceable to maintain a substantially constant approach distance between said probe tip and the specimen.

6. A method of operating an atomic force microscope to perform a surface measurement of a specimen at a point, the atomic force microscope including a flexible cantilever with a probe tip affixed to a free end, the method comprising:
    a) incrementally advancing one of the cantilever and specimen so as to reduce a spacing between the probe tip and the specimen;
    b) determining an increment in which contact between the probe tip and specimen occurs and stopping the advancing upon the contact;
    c) withdrawing one of the cantilever and specimen following the contact between the probe tip and the specimen by applying a first momentary force to the cantilever, proximate the probe tip, sufficient to overcome an adhesion force between the probe tip and specimen at the point until a release from contact occurs.

7. The method of operating an atomic force microscope as defined by claim 6, wherein after the adhesion force is overcome the method further comprises adjusting an initial separation distance between the probe tip and specimen to achieve a substantially constant approach distance before repeating a) through c) at a new point of the specimen.

8. The method of operating an atomic force microscope as defined by claim 6, wherein after said applying, the method further comprises applying a second momentary force to the cantilever, said second momentary force driving the cantilever to restore a neutral position of the cantilever.

9. A method of measuring the surface properties of a specimen using an atomic force microscope, the atomic force microscope including: a flexible cantilever with a probe tip affixed to a free end, a displaceable cantilever base supporting the flexible cantilever and providing relative motion in the Z-axis between the cantilever and the specimen, a scanner providing relative motion in the X, Y and Z axes between the probe tip and the specimen, a deflection detector, and a pulse release system, the scanner being driven to effect a scan of the specimen, the scan being defined by a plurality of X-Y coordinates, for each of X-Y coordinate, the method comprising:
    driving one of the cantilever base and scanner to effect an approach between the specimen and probe tip;
    analyzing signals from the deflection detector to identify a point of contact sufficient to create an adhesion force, at the point of contact, between the probe tip and the specimen and stopping the approach when the point of contact is identified;
    determining the surface height at the point of contact;
    withdrawing one of the cantilever base and scanner to effect an initial withdrawal of the cantilever base from the specimen;

activating the pulse system to generate a force on the cantilever free end sufficient to overcome the adhesion force and release the probe tip from the specimen; and determining an approach distance for a new point; and adjusting one of the cantilever base and scanner using the approach distance for the new point.

10. A method of operating an atomic force microscope to perform a surface measurement of a specimen, said microscope including a cantilever having a movable base portion and a free end that is deflectable relative to the base portion, and having a probe tip affixed to said free end; the method comprising:

advancing one of the cantilever and specimen toward one another, substantially continuously monitoring a position of said cantilever base portion and cantilever deflection, substantially continuously controlling the position of the cantilever base portion and the cantilever deflection such that when the monitoring indicates that a contact between the probe tip and the specimen has occurred the advancing is halted, and determining an adhesion force between the probe tip and specimen, responsive to said contact, by applying an increasing force to the cantilever at least until a momentary force is applied to the cantilever that is sufficient to overcome the adhesion force between the probe tip and specimen.

11. A method as defined in claim 10 further including controlling the position of the cantilever base portion or the cantilever deflection within about 5 microseconds of said monitoring determining a change of said position or deflection.

12. A method as defined in claim 10 further including recording and selectively outputting complete force curves for all pixels in a scan of a specimen.

13. The microscope according to claim 1, wherein the processor adjusts the Z-axis position of at least one of the cantilever base and the scanner to maintain a substantially constant cantilever approach start distance relative to the sample.

14. The microscope according to claim 1, wherein the controller provides a signal to the probe tip release system during cantilever withdrawal to apply a second momentary force on the probe tip, opposite said momentary force.

15. The microscope according to claim 1, wherein after each approach increment the controller performs a running curve fit for a plurality of samples to determine a present cantilever deflection value.

16. The microscope according to claim 1, wherein the processor determines probe tip contact by a change in slope of the curve fit.

17. The microscope according to claim 1, wherein the momentary force of the probe tip release system is applied incrementally only until said momentary force overcomes the adhesion force between said probe tip and the specimen.

18. The method of claim 6, further comprising applying a second momentary force to the cantilever, opposite said first momentary force, to reduce cantilever deflection before initiation of a next advance.

19. The method of claim 6, further comprising performing a running curve fit for a plurality of samples during each increment to determine a present cantilever deflection value.

20. The method of claim 19, wherein probe tip contact is detected by a change in slope of the curve fit.

21. The method of claim 6, wherein the momentary force is applied in specified increments until said momentary force overcomes the adhesion force between said probe tip and the specimen.

22. A probe tip release system for an atomic force microscope having a flexible cantilever with a probe tip affixed at one free end, the probe tip release system comprising:

means for detecting a contact between said probe tip and a specimen and halting a movement of the probe tip relative to the specimen in response thereto;

means for inducing relative withdrawing motion between said probe tip and the specimen following contact, to identify an adhesion force, by applying an increasing force to said probe tip at least until a release force sufficient to overcome the adhesion force exhibited between said probe tip and the specimen is reached.

23. A probe tip release system as defined by claim 22, wherein the force applying means comprises:

a magnetic particle affixed proximate said cantilever free end; and an electromagnetic coil, said coil generating a magnetic field in response to a received signal from said means for detecting.

24. A probe tip release system, as defined by claim 23, wherein the means for inducing relative withdrawing motion includes at least one piezo-electric element displaceable along an axis substantially perpendicular to a surface of the specimen.

25. A processor controlled method of operating an atomic force microscope comprising:

at a coordinate location, a) based upon a storable value, decreasing a distance between a specimen and a tip of a cantilevered probe by an incremental amount, b) calculating a deflection force between the specimen and the tip for an increment indicated by the value, c) determining, for the increment, whether a contact between the specimen and the cantilevered probe tip has occurred based upon the deflection force, the contact between the specimen and the cantilevered probe tip having an associated adhesion force, and, when contact between the specimen and probe tip occurs, storing the value, halting the decreasing the distance, and effecting a pulsed release of the probe tip by, d) applying an amount of withdrawal force to the tip;

e) checking whether the adhesion force between the tip and the specimen was overcome by the withdrawal force, and when the adhesion force is overcome, f) identifying a release increment and moving the tip to a new coordinate location.

26. The method of claim 25 wherein, when the contact has not occurred after c), the method further comprises:

repeating a), b) and c).

27. The method of claim 26 wherein, if the adhesion force was not overcome, the method further comprises:

g) increasing the withdrawal force by an incremental amount and repeating d) and e).

28. The method of claim 25 wherein, if the adhesion force was not overcome, the method further comprises:

g) increasing the withdrawal force by an incremental amount and repeating d) and e).

29. The method of claim 27 further comprising:

repeating g) until the adhesion force is overcome and accelerating a return of the tip to a neutral position.

30. The method of claim 25 wherein the tip has a neutral position, the method further comprising:

after the adhesion force has been overcome, accelerating a return of the tip to the neutral position.

31. An atomic force microscope comprising:

a deflectable cantilevered probe having a tip;

a specimen surface initially displaced from the tip;

a controller coupled to the deflectable cantilevered probe and the specimen surface; and a program, executable by a processor which will adjust spacing, in increments, between the specimen surface and the tip, at a point, until an indication of a contact occurs, the program being constructed to, at the point,
    a) decrease the spacing between the specimen surface and the tip,
    b) determine whether the tip has contacted the specimen surface based upon a deflection of the cantilevered probe;
    c) cease to decrease the spacing at the point and store a value based upon the indication, from which a height of the specimen at the point can be derived when the tip contacts the specimen with an adhesion force and, incrementally apply a force to the probe tip to effect an overcoming of the adhesion force.

32. The microscope of claim 31 wherein the program is further constructed to calculate the height of the specimen at the point using the value.

33. The microscope of claim 31 wherein the program is further constructed to calculate the height prior to effecting an overcoming of the adhesion force.

34. The microscope of claim 33 wherein the program is further constructed to compare a contacting force to a threshold force.

35. The microscope of claim 31 wherein the program is further constructed to determine whether the tip has contacted the specimen by comparing a contacting force to a threshold force.

36. The microscope of claim 31 wherein the program is further constructed to determine whether an approach value maximum has been exceeded by a sum of an approach value and an increment.

37. The microscope of claim 36 wherein the approach value is a current approach value and the program is further constructed to withdraw the deflectable cantilevered probe and move the specimen surface towards the tip when the approach value maximum has been exceeded by the current approach value.

38. A method of obtaining a specimen height profile using an atomic force microscope comprising:

for at least two points on a specimen,
    a) incrementally reducing a distance between a probe tip and the specimen;
    b) for each increment, taking a measurement sample to determine if a contacting force threshold has been exceeded for an increment;
    c) storing a value from which a profile height for the specimen can be calculated when the contacting force threshold has been exceeded; and
    d) retracting the probe tip from the specimen by incrementally changing a release signal until the adhesion force is overcome.

39. The method of claim 38 wherein the distance between the probe tip and the specimen is incrementally reduced by an angstrom.

40. The method of claim 38 further comprising, following the retracting, automatically moving the probe tip to a new point and incrementally bringing the probe tip and the specimen closer together at the new point.

41. An atomic force microscope for obtaining a profile of a biological specimen comprising:

means for moving the biological specimen in three dimensions;

means for minimizing excitation of oscillations of a free end of a cantilever incrementally approaching the biological specimen;

program means for determining a specimen profile height at a point based upon an adhesion force detection value and a position of the specimen in one of the three dimensions; and pulse release circuit means for sequentially applying an increasing force to the cantilever until the adhesion force is overcome and a tip release occurs.

42. The microscope of claim 41 further comprising:

means for accelerating return of the cantilever to a neutral position.

* * * * *